United States Patent [19]

Heusinkveld

[11] Patent Number: 4,791,408

[45] Date of Patent: Dec. 13, 1988

[54] KEYBOARD FOR ONE-HAND OPERATION

[75] Inventor: Paul Heusinkveld, American Consulate-Jeddah APO, New York, N.Y. 09697-0002

[73] Assignees: Ted Scudder, Arlington Heights, Ill.; Paul Heusinkveld, Arlington, Va.

[21] Appl. No.: 49,622

[22] Filed: May 14, 1987

[51] Int. Cl.$^4$ .............................................. G06F 3/02
[52] U.S. Cl. ........................... 340/365 R; 340/365 S; 340/407; 400/479
[58] Field of Search ........ 340/365 S, 365 R, 365 VL, 340/825.19, 407; 200/5 R; 400/478, 487, 489, 87

[56] References Cited

U.S. PATENT DOCUMENTS

| | | | |
|---|---|---|---|
| 3,428,747 | 2/1969 | Alferieff | 340/365 R |
| 4,005,388 | 1/1977 | Morley et al. | 340/365 R |
| 4,360,892 | 11/1982 | Endfield | 340/365 S |
| 4,467,321 | 8/1984 | Volnak | 340/365 VL |
| 4,517,424 | 5/1985 | Kroczynski | 340/365 R |
| 4,584,443 | 4/1986 | Yaeger | 340/365 R |

FOREIGN PATENT DOCUMENTS

86/03870 7/1986 World Int. Prop. O. ...... 340/825.19

OTHER PUBLICATIONS

"Keyboard for Handheld Computer"–IBM Technical Disclosure Bulletin–vol. 27, No. 10A, Mar./85–pp. 5643–5645.

Primary Examiner—Marshall M. Curtis
Assistant Examiner—Mahmoud Fatahi-Yar
Attorney, Agent, or Firm—Richard C. Litman

[57] ABSTRACT

A data entry device having five keys, not in one plane, is held in and operated by one hand. Each key has two "on" positions and one "off" position. By using a single key or chord of keys to form characters, a surplus of possible combinations is generated. Because it is grippable and requires only one hand to operate, the user can utilized it while simultaneously walking, writing, reading, commuting, using a phone, holding a conversation, or engaging in related and unrelated activities.

5 Claims, 9 Drawing Sheets

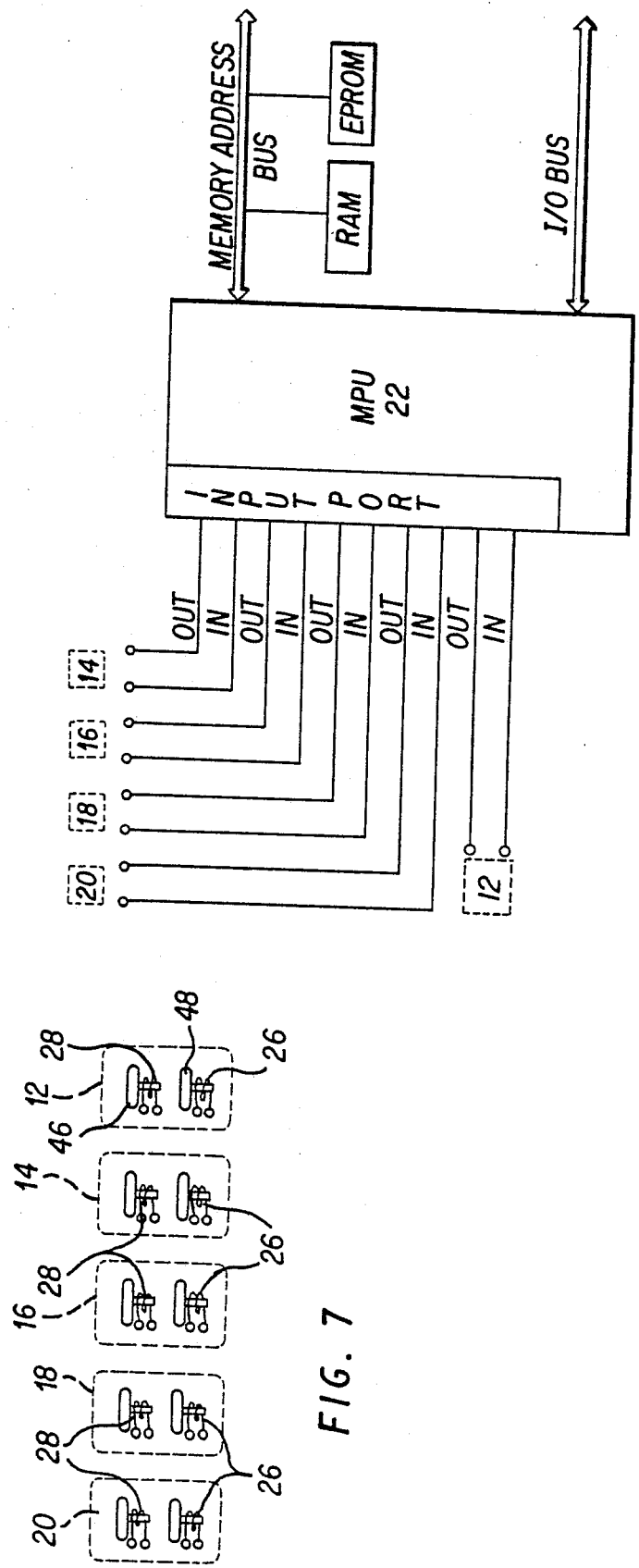

| CHARACTER | | KEYS DEPRESSED | | | | | | | | | |
|---|---|---|---|---|---|---|---|---|---|---|---|
| MODE I | MODE II | THUMB | | INDEX | | MIDDLE | | RING | | LITTLE | |
| | | IN | OUT | IN | OUT | IN | OUT | IN | OUT | IN | OUT |
| A a | 1 | ✓ | | | | | | | | | |
| D d | 2 | | ✓ | | | | | | | | |
| E e | 3 | | | ✓ | | | | | | | |
| H h | 4 | | | | ✓ | | | | | | |
| I i | 5 | | | | | ✓ | | | | | |
| N n | 6 | | | | | | ✓ | | | | |
| O o | 7 | | | | | | | ✓ | | | |
| R r | 8 | | | | | | | | ✓ | | |
| S s | 9 | | | | | | | | | ✓ | |
| T t | 0 | | | | | | | | | | ✓ |
| | | | | | | | | | | | |
| B b | ; : | ✓ | | ✓ | | | | | | | |
| C c | ? ! | | ✓ | | ✓ | | | | | | |
| F f | ' " | | | ✓ | | ✓ | | | | | |
| G g | ( ) | | | | ✓ | | ✓ | | | | |
| J j | [ ] | | | | | ✓ | | ✓ | | | |
| K k | { } | | | | | | ✓ | | ✓ | | |
| L l | - _ | | | | | | | ✓ | | ✓ | |
| M m | + - | | | | | | | | ✓ | | ✓ |
| P p | x ÷ | ✓ | | | | ✓ | | | | | |
| Q q | = ≠ | ✓ | | | | | | ✓ | | | |
| U u | / \| | ✓ | | | | | | | | ✓ | |
| V v | * # | | | ✓ | | | | ✓ | | | |
| W w | & @ | | | ✓ | | | | | ✓ | | |
| X x | $ ¢ | | | ✓ | | | | | | | ✓ |

SINGLE KEY DEPRESSIONS (rows A–T)

DOUBLE KEY DEPRESSIONS (rows B–X)

FIG. 8(a)

| CHARACTER | | KEYS DEPRESSED | | | | | | | | | | |
|---|---|---|---|---|---|---|---|---|---|---|---|---|
| MODE I | MODE II | THUMB | | INDEX | | MIDDLE | | RING | | LITTLE | | |
| | | IN | OUT | IN | OUT | IN | OUT | IN | OUT | IN | OUT | |
| Y   y | TAB SET CLEAR | ✓ | | ✓ | | ✓ | | | | | | ↑ |
| Z   z | MARGIN SET CLEAR | | ✓ | ✓ | | ✓ | | | | | | |
| ↓ | | | | ✓ | | ✓ | | ✓ | | | | THREE KEY DEPRESSIONS |
| ↑ | | | | | ✓ | ✓ | | ✓ | | | | |
| (SPACE) | | | | | | ✓ | | ✓ | | ✓ | | |
| (BACK SPACE) | | | | | | | ✓ | ✓ | | | ✓ | ↓ |
| | | | | | | | | | | | | |
| ↵ (RETURN) | | ✓ | | ✓ | | ✓ | | ✓ | | | | ↑ |
| TAB | TAB | | ✓ | | ✓ | ✓ | | ✓ | | | | FOUR KEY DEPRESSIONS |
| . | . | | | ✓ | ✓ | ✓ | | | ✓ | | | |
| , | , | | | | ✓ | ✓ | | ✓ | ✓ | ✓ | | ↓ |
| | | | | | | | | | | | | |
| UPPER CASE | | ✓ | | ✓ | | ✓ | | ✓ | | ✓ | | ↑ |
| MODE CHANGE | | | ✓ | ✓ | | ✓ | | ✓ | | | ✓ | FIVE KEY DEPRESSIONS |
| | | | | | | | | | | | | ↓ |
| ESCAPE | | ✓ | | ✓ | | | | | | | | |
| FUNCTION CHANGE | | | ✓ | ✓ | | | | | | | | |
| (SEE FIG. 8(c)) | | | | | | | | | | | | ↑ |
| | | | | | | | | | | | | CROSS KEY DEPRESSIONS |
| "AND" | | ✓ | | | | ✓ | | | | | | |
| "THE" | | | ✓ | | ✓ | | | | | | | |
| "THAT" | | ✓ | | | | | | | ✓ | | | |
| " " | (AS ASSIGNED) | | ✓ | | | | | ✓ | | | | |
| " " | | | | | | | | | | | | ↓ |

FIG. 8(b)

| FUNCTION CODE | MEANING |
|---|---|
| F 1 | TYPING (WITH PRINTER) |
| F 2 | WORD PROCESSING (WITH CRT) |
| F 3 | STORE INPUT |
| F 4 | OUTPUT MEMORY |
| F 5 | CALCULATOR |
| F 6 | CLOCK-TIME |
| F 7 | ALARM |
| F 8 | STOPWATCH |
| F 9 | MODEM |
| F 10 | PHONE |
| F 11 | PAGER SEND |
| F 12 | PAGER RECEIVE |
| F 13 | BASIC PROGRAMMING |
| F 14 | FORTRAN PROGRAMMING |
| F 15 | FOR HEARING IMPAIRED |
| F 16 | FOR VISUALLY IMPAIRED |
| F 17 | FOR PILOTS |
|  | REMOTE KEYBOARD (WITH INFRARED) |
| NOTE: FUNCTION CHANGES ARE EFFECTED BY UTILIZING SOME OF THE NUMEROUS CROSS-KEY CHORDS NOT ASSIGNED IN FIG. 8(b) ||

FIG. 8 (c)

FIG. 9
FIG. 10
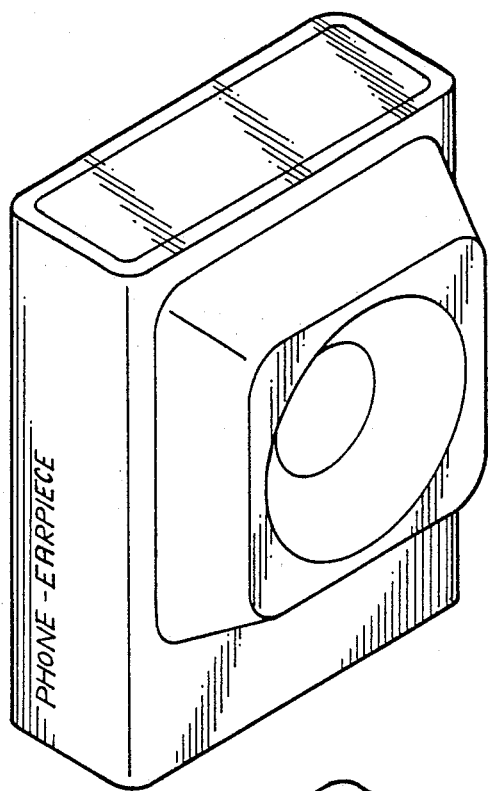
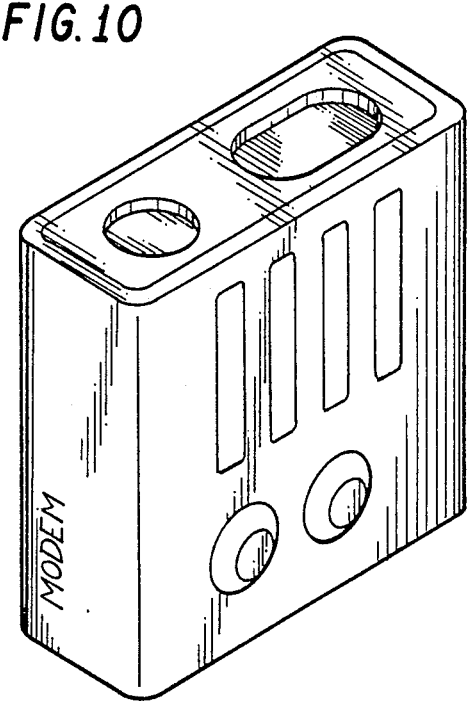
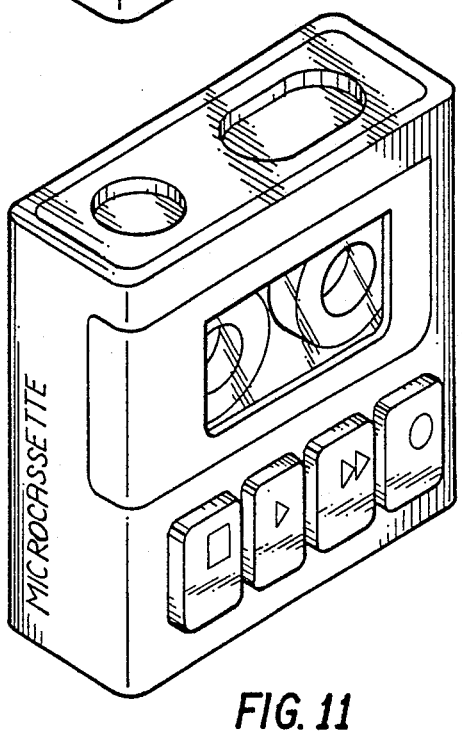
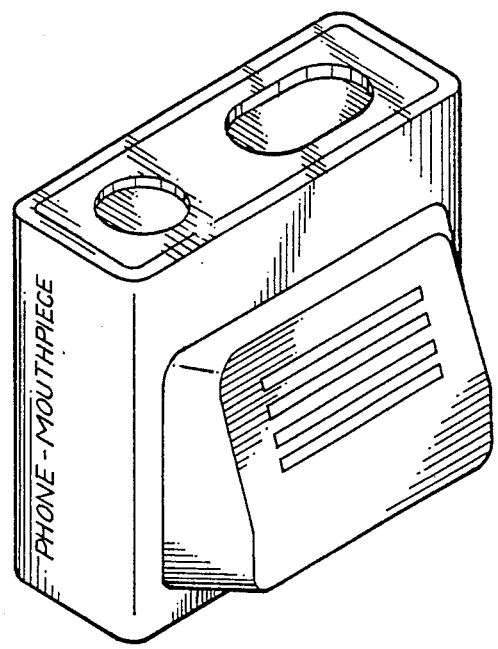
FIG. 11
FIG. 12

KEYBOARD FOR ONE-HAND OPERATION

FIELD OF THE INVENTION

This invention relates to electronic keyboards and keypads and in particular, but not exclusively, to electrical keyboards for encoding electrical signals representing alphanumeric and other readable characters which may be used. This invention also relates to such keyboards and keypads that may be used in combination with communication and computer devices.

BACKGROUND OF THE INVENTION

U.S. Pat. Nos. 4,443,789 and 4,360,892 both of Enfield disclose examples of this type of keyboard.

U.S. Pat. No. 3,833,765, which requires sequential keying, discloses a typewriter capable of being produced in a pocket-sized version. The above patents are directed to keyboard entry data transmission systems, employing one-handed keyboards wherein single characters are uniquely defined by a plurality of key depressions.

The above mentioned patents represent two types of keying (see U.S. Pat. No. 4,344,069 for an explanation) used in one-handed typewriters. The first type of keying is chord keying in which a number of keys are pressed simultaneously; this combination uniquely defines a character. The second type of keying is sequential keying in which a number of keys are pressed in a sequential order that uniquely identifies a specific character.

U.S. Pat. No. 4,042,777 discloses various electronics packages or logic circuits which can be used in conjunction with one-handed keyboards. One-handed keyboards are useful for high-speed communications, making records and providing a means for the hearing impaired or other handicapped people to communicate.

Other designs of five-key keyboards include U.S. Pat. No. 647,853 and Swedish Pat. No. 189,742.

IBM Technical Disclosure Bulletin, Vol. 3, No. 6, dated Nov. 1960, page 16, discloses a 10-key keyboard operated by four fingers and a thumb in a hand cover. Movement of a finger or a thumb toward the center of the cover operates one set of keys, and movement away from the center operates a second set of keys.

A large variety of various types of keyboards and key switches are disclosed in International Patent Application WO 82/011345, including unusual switches at FIGS. 11 and 14 through 17.

Communication aids for the handicapped, employing keyboards, are disclosed in U.S. Pat. Nos. 3,507,376; 4,074,444; and 4,075,621.

SUMMARY OF THE INVENTION

While the above represent significant advances in the science of communication, they fail to suggest a data entry device that can be both gripped (referred to as a keygrip data entry device as opposed to a keyboard or keypad) and operated by one hand, without the fingers ever leaving the keys to which they are associated, and that is capable of generating, transmitting, and receiving all of the letters, both upper case and lower case, and all of the numerals, symbols, punctuation, and text formatting necessary for word processing.

The present invention, which uses only five keys, not only accomplishes the just-cited functions which the prior art is incapable of accomplishing, but generates most of the letters used in communications with only five keys, using single keys and single keystrokes to generate each letter without shifting modes. The five keys are operated by the five fingers of one hand, preferably the left hand. The five fingers include the thumb even though the thumb may be referred to specifically in some instances.

The keygrip has been designed or conceived as an electronic, pocket-sized, gripable, ergonmetrically-designed device having universal or generic application in replacing or substituting for any device having keys or pushbuttons for input, such as on: keyboards, keypads, calculators, stenographs, watches, alarm clocks, cellular phones, remote television control boxes, computer mice, pagers, telephones, machinery control devices, and cash registers. The attached drawings represent some examples of the basic keygrip and attachments that are used to accomplish these capabilities or tasks. The keygrip contains both hardware and software modules. Thus, by interchanging the modules on the keygrip, the user can accomplish a wide variety of tasks.

The hardware modules can be added singly or in combination with other modules of the keygrip as appropriate. Software modules would be physical chips or circuitboards that are electronically placed into the keygrip itself.

The keygrip has been designed to perform the following data functions: input, output, storage, retrieval, and translation. It can also be used in communicating at high speeds, making records, entering data, receiving and sending information to the handicapped, and controlling machinery.

The enhanced capability of the present five-key keyboard is in part due to each key having two "on" positions and one "off" position. The keys preferably slide back and forth, rather than just move up and down.

More on and off positions can be utilized but are not necessary. To the 10 different on positions of the five keys are assigned the 10 letters "a", "d", "e", "h", "i", "n", "o", "r", "s", and "t". These 10 letters constitute an average of 75 per cent of most written text according to a book, *The Code Breakers,* by David Kahn. To be more specific, the present invention is directed to a manually operable input and output chord keyboard.

The keyboard is operable on the outer surface of a casing. The keys are not in one plane (surface). The casing is small enough to be held by the fingers of one hand, wrapped at least partially around the casing.

A series of alternate circuits is contained in the casing. Keys are employed for introducing potential into one of two alternate circuits by movement, on the outside of the casing, of a tip of each finger or tip of the thumb. Each tip controls the introduction of an electrical potential into two different, alternate circuits. Each tip also controls a neutral position where no activating potential is introduced into a circuit. The potential can be generated by known means, such as a power supply switched by capacitance or contact switching with or without the use of gates, such as nand gates.

The potential can also be generated by solenoids, containing permanent magnet cores. This method allows the device to respond to its user (i.e., by moving a key to a different position, a new character is generated and transmitted back to the user). Thus, the keygrip has two modes of communication: the send mode where the user enters characters to the keygrip, and the receive mode where the keys of the keygrip move to a different position to generate and transmit character information to the user.

The solenoids find particular application in communication with the handicapped (blind and speechless), as the solenoids can be used both to send and receive information.

As an alternate receive mode, the keys can have two pushbuttons installed on them: one at each end of the keys. These pushbuttons will normally be flush with the key surface in the inactuated mode. However, when actuated, they will be raised by a solenoid to a level above the surface of the keys so that they can be felt by the fingertip. When a pushbutton that is closer to the fingertip is raised, it will be the equivalent to that of a key being moved away from the palm of the hand. When a pushbutton that is closer to the palm of the hand is actuated, it is equivalent to a key being moved toward the palm of the hand.

It is preferred that the letters "a", "d", "e", "h", "i", "n", "o", "r", "s", and "t" be assigned to single keys and not to key combinations since they are the most frequently used letters.

It is also preferred that the numbers "0" through "9" be assigned to single keys and not to key combinations. A mode shift is provided for shifting the keyboard from numbers to letters so the same keys can be used for both.

As there are many key combinations which are not used, some of these could be assigned to words so that the keygrip user can generate whole words with one or more key depressions. This would save considerable time since the 10 words, "the", "of", "and", "to", "a", "in", "that", "it", "is", "I", constitute approximately 25 percent of a given average text. Thus, three of the cross-finger depressions have been assigned to the words "and", "the", and "that". By cross-finger depressions it is meant that the multiple finger depressions are not all toward or away from the palm as is the case with all single, character-, numeral-, and symbol-key depressions. Other nonused key depressions could have words assigned to them by the user to fit his specific needs.

The keyboard preferably has five keys: four non-thumb finger keys, and one thumb key positioned on the outside of the casing. The keys are not all in the same plane; they are in different planes which allow the operator to simultaneously hold and operate the device. The keys are arranged to be operated with only one hand, without moving any finger or the thumb away from the key with which it is associated.

The keys are arranged to be selectively operable individually and also in different combinations to provide a different preselected key or combination of keys for each character in an alphabetic system, having a total number of characters greatly exceeding the number of said keys. Each key is a switch, having two "on" positions and one "off" position. If desired, the tension level and center position of the keys can be made adjustable to suit the needs of the user.

Through the use of logic circuits (digital electronics and programmable microprocessors), known in the art, each unique coded electrical output from the keys represents a different character in the system. A unique preselected key or combination of keys represents a character in a preselected group of characters.

The term key, as used herein, includes any kind of switching device that can be actuated by a fingertip, including sliding switches, capacitance switches, in and out switches that are spring biased in a center-noncontact position, or their equivalents. Fingertip refers to the sensitive, skin covered end of the human finger that is normally used for typing on a conventional typewriter.

The keygrip is designed to have modular attachments that can be connected attached directly to the top or bottom of it. This feature greatly enhances the utility of the device, without affecting its ease of use; it is still gripable in one hand and extremely mobile.

Another feature of this device is that it keeps the user continuously informed of what mode (letters, numbers and symbols, function, etc.) and case (upper and lower) he is in. This is accomplished by raising the pushbuttons on the keys during the input mode. When the user is entering data in upper case, both pushbuttons on the thumb key are actuated (raised). When in the numbers and symbols mode, both pushbuttons on the index finger key are actuated. When in the function mode, both pushbuttons on the middle finger key are actuated. This procedure enables the user to have continuous tactile feedback from the device, indicating to him in what mode or case data is being entered. This does not require visual feedback and thus frees the user's eyes for other tasks.

BRIEF DESCRIPTION OF THE DRAWINGS

FIG. 5 is a schematic diagram of the digital logic signal lines associated with each key and connected to an associated programmable microprocessor.

FIG. 6 shows a plug-on screen that can be used by the input or output of FIG. 5.

FIG. 7 shows solenoid-operated pushbuttons in a key of the keyboard of FIG. 1.

FIGS. 8 (a) through 8 (c) list the character, mode, key, and function available with the keygrip.

FIG. 9 shows a phone-earpiece module for the keyboard of FIG. 1.

FIG. 10 shows a modem module for the keyboard of FIG. 1.

FIG. 11 shows a microcassette module for the keyboard of FIG. 1.

FIG. 12 shows a phone-mouthpiece module for the keyboard of FIG. 1.

DETAILED DESCRIPTION

Figure 1:
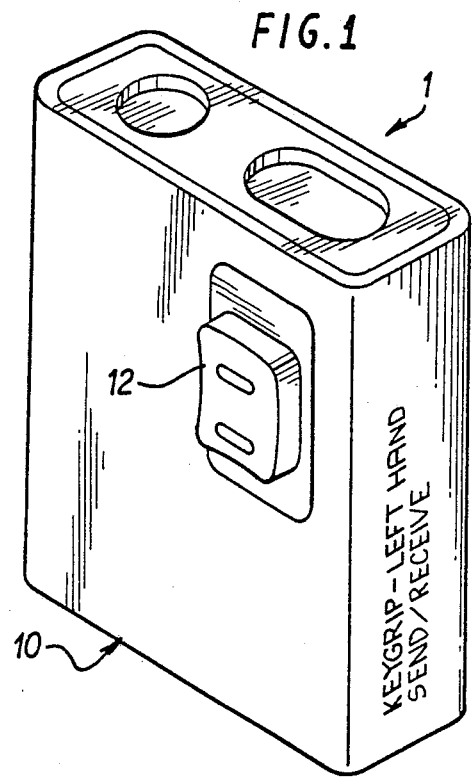
FIG. 1 is a view of a five-key keyboard, showing the thumb-key side.
Figure 2:
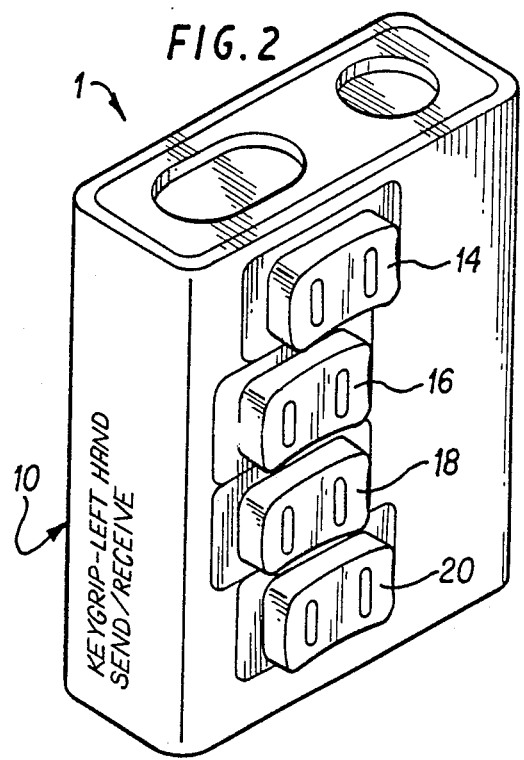
FIG. 2 is a view of the keyboard of FIG. 1, showing the four finger-key side.
Figure 3:
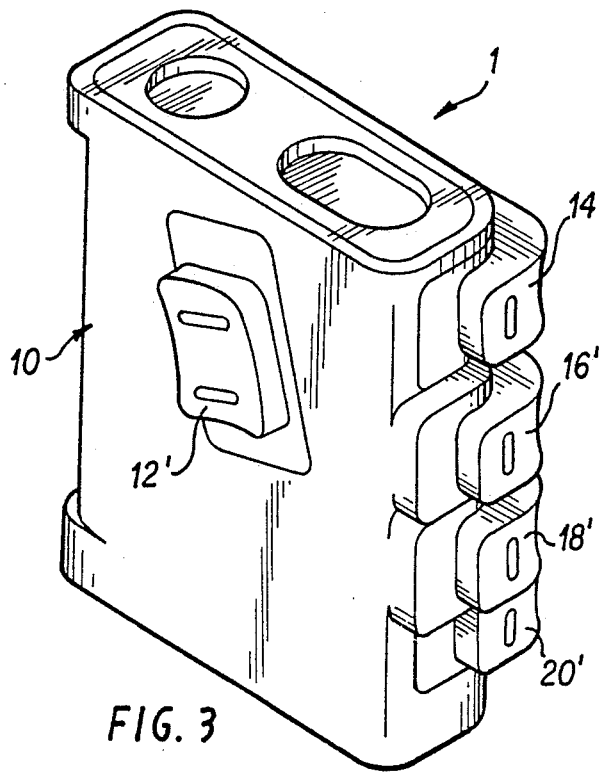
FIG. 3 shows a modified key version of FIG. 1.
Figure 4:
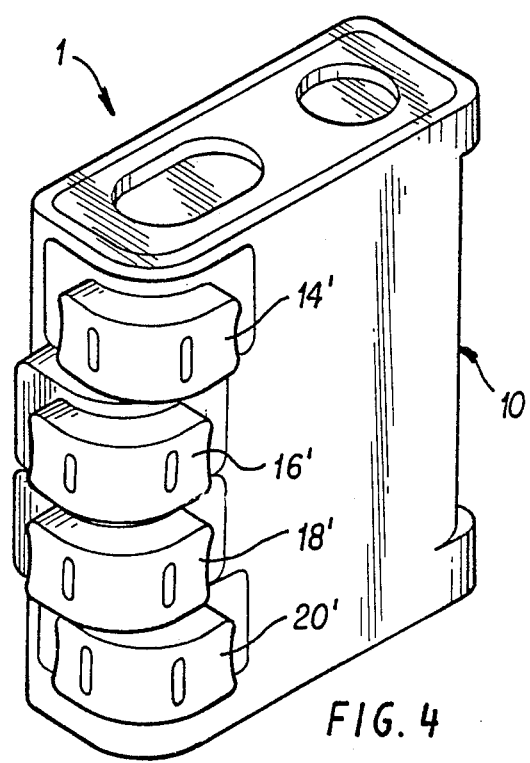
FIG. 4 is a view of the keyboard of FIG. 3, showing the four finger-key side.
Figure 13:
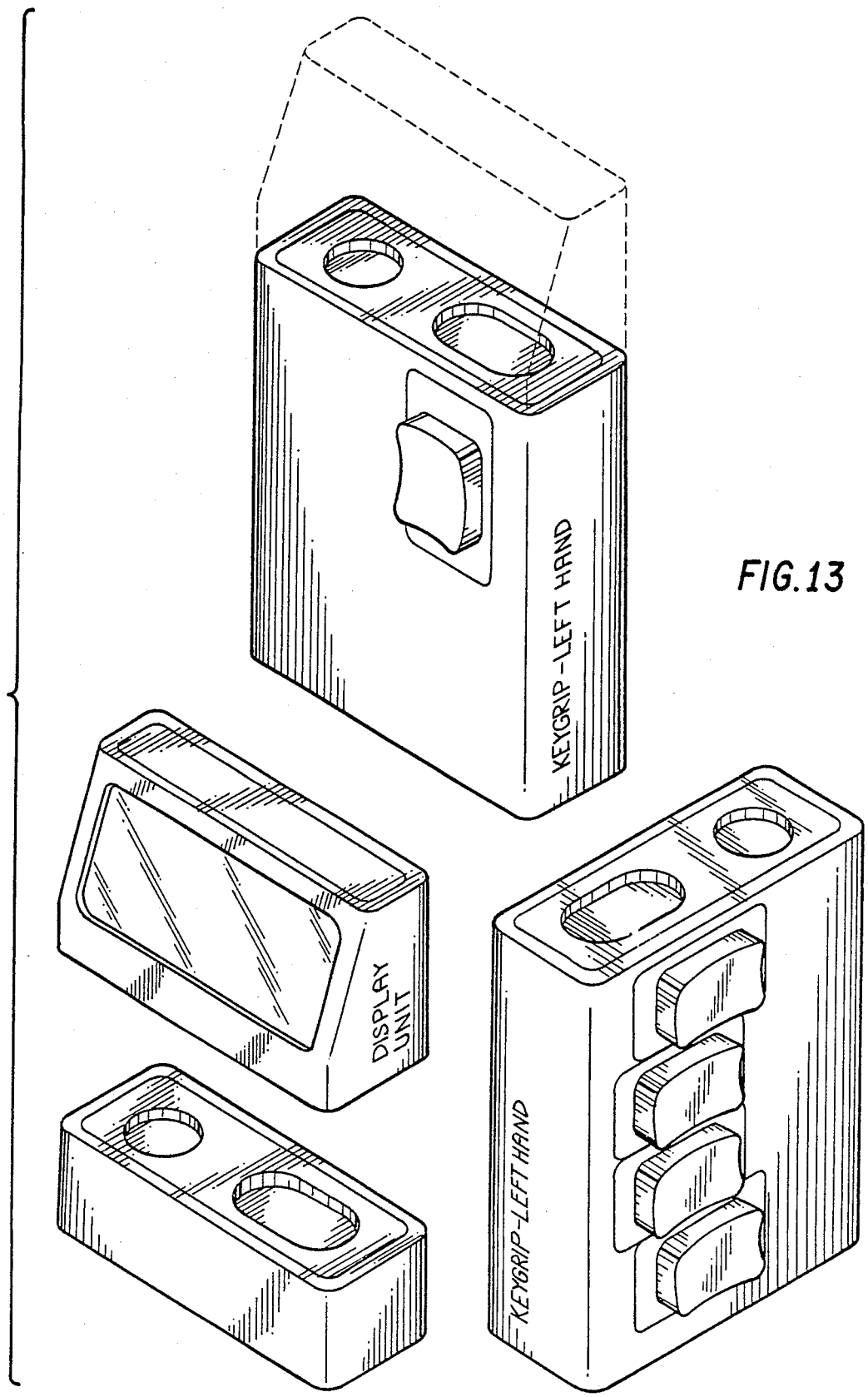
FIG. 13 shows a display unit module for the keyboard of FIG. 1.
Figure 14:
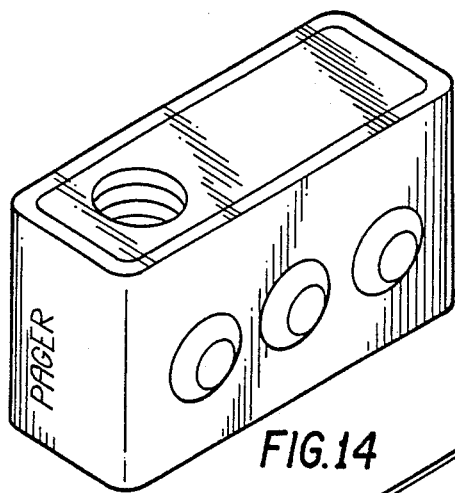
FIG. 14 shows a pager module for the keygrip.
Figure 15:
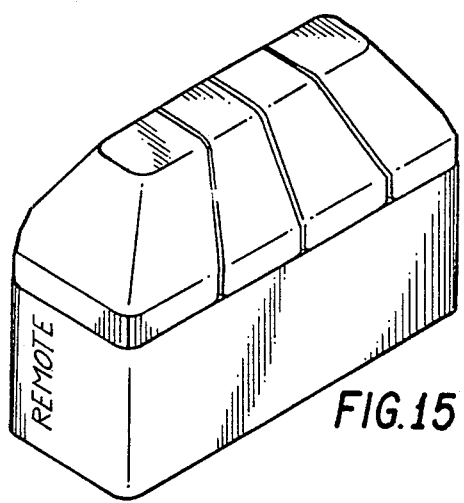
FIG. 15 shows a remote module for the keygrip.
Figure 16:
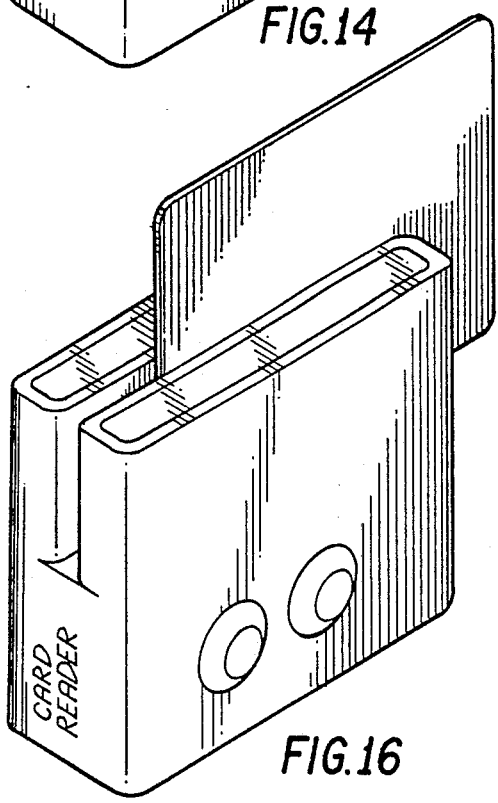
FIG. 16 shows a card reader module for the keyboard of FIG. 1.
Figure 17:
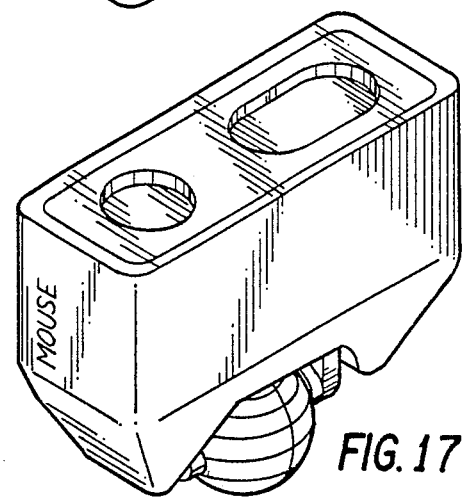
FIG. 17 illustrates a mouse module for the keyboard of FIG. 1.
Figure 18:
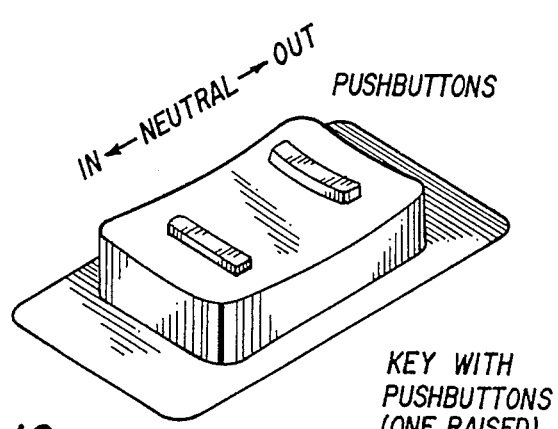
FIG. 18 illustrates a typical key with one pushbutton raised.
Figure 19:
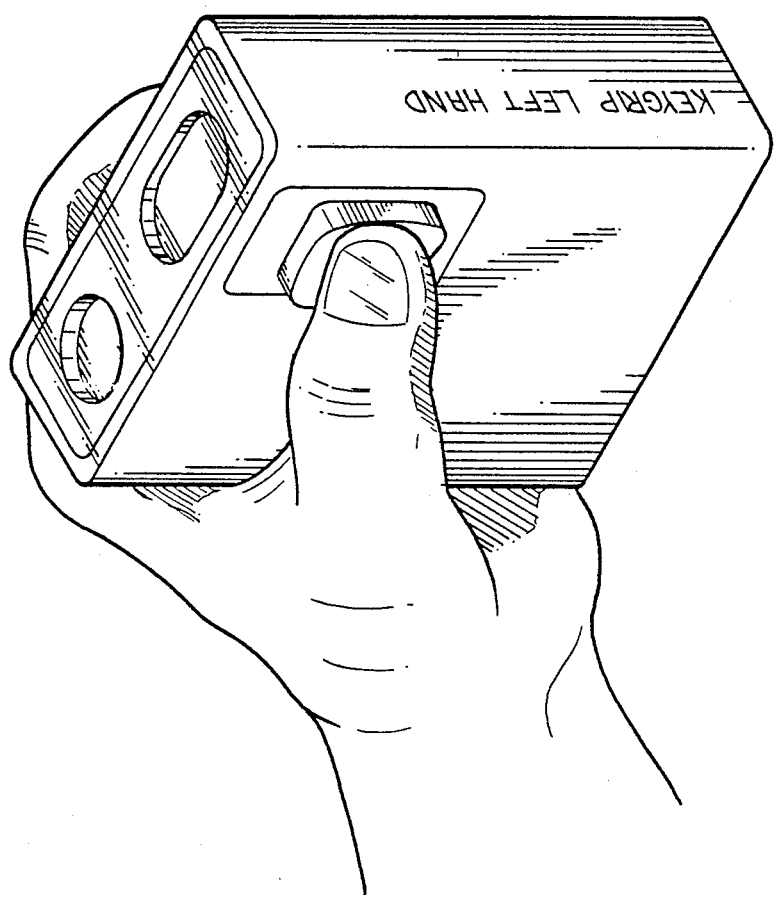
FIG. 19 shows a keygrip being held.

As shown by FIGS. 1 and 2, the keygrip data entry device 1, referred to herein also as a keygrip, is essentially a simple device consisting of a housing 10, designed to fit into a hand which partially encircles it. Five switching keys 12, 14, 16, 18, and 20 are arranged in a pattern, not in one plane, so as to be convenient to the fingers and thumb of an operator's hand--in this case, the left hand. Switch 12 being the thumb key which is actuated by sidewise motion of the thumb tip in either direction.

Movement of the thumb key or switch 12 in one direction actuates one circuit; movement in the opposite direction actuates a second circuit; and the center position is off--no circuit is actuated by the thumb key.

Switch 14 is the index finger key; switch 16 is the middle finger key; switch 18 is the ring finger key; and switch 20 is the little finger key. The switches are conventional, three-position pushbutton switches consisting of two positions on and center position off.

As is evident from FIGS. 1 through 4, the keys are convenient to the thumb and the fingers of the hand, when the hand is holding housing 10. The keys are operated by pushing a fingertip away from or toward the palm of the hand.

The alphabet is generated by use of particular key combination codes, described in FIGS. 8(a) and 8(b) and transferred as voltage signals to a conventional microprocessor, within the housing 10. Other required functions, such as numerals, text formatting, and punctuation are performed by means of shifting as explained later.

FIGS. 8(a), 8(b), and 8(c) show the alphabet, numerals and symbols, and function codes, respectively that are available to the keygrip apparatus. Since there are five character-controlling keys with each key having two different on positions, it is possible to operate the keys in many different combinations. As can be seen, the keys are chosen so that for 10 letters, only one key per letter need be moved. For most text, the 10 letters chosen constitute approximately 75 percent of the text. For the remaining letters, only two conveniently spaced keys need be pressed; for "y" and "z", three keys must be pressed. The sequence in which each key is pressed to generate a letter is not important, since the number of combinations available with double-contact switches is so high that it makes key sequencing for letter forming unnecessary. It should also be noted that the movement of all of the fingers in forming each letter, in the rare instances when more than one finger is used, is always in the same direction.

To obtain upper-case letters of mode I, all keys must be moved in toward the palm. By repeating the above motion before you start typing, you cause the shift function to lock in the upper-case mode. To return to lower-case mode, perform the inverse of the just-cited procedure.

To shift to mode II (the numerical mode), all keys are moved away from the palm.

Again, from *The Code Breakers*, it is known that 10 words constitute more than one quarter of any text. As is shown by FIG. 8(b), two opposing key strokes can be employed to introduce any of these words into text. These words are listed here for suggestion, but are user-defined.

The different functions that can be performed with the keygrip are outlined in FIG. 8(c).

The electronic circuitry used in the operation of the keyboard of the present invention is either known or obvious to one skilled in the particular electronics art and will not be described in detail here. The disclosure of U.S. Pat. Nos. 4,443,789 and 4,360,892 is hereby incorporated by reference into the present applications for a disclosure of related circuits. Input and output electrical connectors are of conventional or obvious design.

When the device is used as a word processor, plug-on screen 24 can optionally be employed. Screen 24 has a liquid-crystal display.

As is shown in FIG. 7, each key has two pushbutton switches installed on them 46 and 48: dual-action solenoids 26 and 28 are attached to each of the pushbuttons 46 and 48. These pushbuttons are normally flush with the key surface in the inactuated mode. However, when the solenoids are actuated by electrical current from the programmable microprocessor 22, the solenoids will cause the pushbuttons to be raised to a level above the surface of the keys so that they can be felt by the fingertip. This results in the programmed key movement of FIGS. 8(a) and (b). Movement of the keys can be felt by a visually impaired person and the incoming message interpreted.

An important, unique, and distinctive attribute or asset of the keygrip is that it can easily be used while its user is simultaneously undertaking or engaging in other activities that may or may not be related to his activity or interaction with the keygrip. It is held in one hand, preferably the left hand, while allowing the user to use the other hand, legs, and eyes for other activities. The following are specific and noteworthy examples that illustrate this capacity or capability:

1. A pilot can be operating the device while still using his eyes, legs, and one hand to pilot or fly his aircraft. With the keygrip, he can be entering or receiving information, such as weather, aircraft or payload status. He can also command functions to help control his aircraft or payload.

2. A doctor can be conducting rounds or be diagnosing a patient while, at the same time, writing or typing the results for inclusion in the patient's medical records or in a computer for automatic evaluation and diagnoses. He can also be recalling or querying vital information from the patient's records, such as allergies or blood type to aid in the diagnoses.

3. A secretary can be typing with the keygrip or interacting with a computer or data base while simultaneously carrying out other activities related to her job, such as answering the phone, taking dictation, and delivering a message or package. Also, if she had the telephone attachments connected to the keygrip, she can be both dialing and holding the phone in one hand, thus freeing the other hand for some other work.

4. A writer or businessman can be composing an article or letter, while riding in a car or flying in an airplane.

5. An interviewer or reporter can be taking notes on his interview in a manner that would be almost unnoticeable to the individual being interviewed or to others.

6. A student can be taking notes in class, while maintaining his vision and primary attention on the presentation. By later entering his notes into a word processor, the student will end up with a much more useful study aid than otherwise possible.

7. Military commanders can be using the keygrip to display, digest, peruse, and evaluate vast quantities of complex and disparate, rapidly-changing information that they are now required to deal with and expeditiously act upon--that is, to command and control their large resources. The keygrip can also be used to quickly query data bases, provide input, determine what information to display on output screens, etc.

8. Individuals can be communicating over long distances and save considerable amounts of money on phone bills, using the modem attachment. Instead of communicating in voice, the individuals can be using the keygrip with its modem, in conjunction with data compression techniques, to send information much faster than is possible by voice; thereby, using only a fraction of the time on the phone.

9. Hearing impaired people can be carrying on a two-way conversation, using keygrips attached by cord, phone lines, microwave or infrared-light beams. The hearing impaired can "listen" to television, music, movies, or radio that has been modified to generate signals that are interpreted by the keygrip. This device would make the hearing impaired much more mobile, if they can communicate by phone by attaching a modem to it. In some situations, it can replace signing and would be preferable or superior to it, since: (1) the keygrips frees one hand; (2) the finger movements are shortened; and (3) the arm movements are eliminated. Thus, this device makes it a faster means of communication.

10. Visually impaired people can use the keygrip to "read" public information or warning signs that have been modified to generate low-level, microwave signals (as already discussed) to the keygrip. For example, street crossing signals, escalator warning signals, direction information, or posted bus schedules can all be transmitted in a short-range, low-power, and continuous basis to aid the visually impaired people in the immediate vicinity. Elevators can easily be modified to transmit these signals to inform the visually impaired riders on what floor they are on by communicating through the keygrip. This practice can be unnoticeable by most of the population and help the handicapped people to be much more independent. Similar systems can provide directional beams to guide these people through public areas, such as stores, sidewalks, libraries, hospitals, schools, and terminals. They can also use a card reader to verify cards and money bills.

11. Physically handicapped people can use the device to control other modified devices, such as keyboards or wheelchairs, that they otherwise could not use.

The keygrip can also be used by a host of other professions, such as astronauts, machine operators, translators, air-traffic controllers, sales personnel, bank tellers, telephone operators, computer graphics personnel, stenographers, stock brokers, and decision makers.

Another use contemplated for the present invention includes its ability to answer a telephone page by way of a cellular phone link. The return message can be formulated and stored in the microprocessor, then transmitted at 2400 baud or faster rate, thus greatly reducing the battery drain of slow, voice communications equipment.

By pressing a single key or chord of keys, many possible combinations exist, allowing each character to be distinctly defined. Many more possible combinations exist than are utilized. Although there is no specific assignment of possible combinations to corresponding characters, one is provided to illustrate and serve as the preferred embodiment. This embodiment is logically designed to be easily remembered and learned, and also is extremely efficient. It is efficient because the 10 letters ("a", "d", "e", "h", "i", "n", "o", "r", "s", and "t") correspond to single key depressions. These 10 letters constitute an average of 75 percent of most written text.

The keygrip word processor of the present invention is a one-handed keyboard that has all of the key inputs of a typewriter or terminal keyboard. By requiring only one hand to operate, the user may do other tasks while simultaneously entering information into the keygrip word processor or computer. The keygrip word processor can be operated remotely from a terminal and then the input information can be transmitted in real time or batch (at a later time, through a storage medium).

The keygrip word processor is an extremely mobile device that can be operated virtually anywhere. In its basic configuration, it is an extremely simple and uncomplicated device--since it has only five keys. This makes it both inexpensive to build or construct (relative to standard keyboards) and easy to learn.

Learning to use the keygrip word processor is also easy due to its logical organization and ergonometric design:

1. The most common input letters or numbers are single-pressed inputs.

2. The inputs are grouped, by numbers of presses required, into easy-to-remember and logical groupings.

3. It is not necessary to place the keygrip word processor on any surface, such as is required by a lap-held, portable word processor. It is a completely self-contained unit which can be operated in and by one hand.

4. It is also extremely simple to use, since it only has five keys and the fingers never leave the keys.

What is claimed is:

1. A manually-operable, input-chord keyboard, comprising in combination;

a pocket-sized, ergonomically-designed casing, that is small enough to be gripped and operated by the fingers and thumb of one hand, said casing gripped between the thumb and fingertips;

a series of alternate, digital-logic signal lines, connected to a programmable microprocessor that is contained within the casing;

means for introducing several digital logic signals into the programmable microprocessor that is accomplished by movements of keys, four of said keys mounted on one side of said casing, one key mounted on the opposite side of said casing; each said key being associated with two contacts, and said keys being slideable along the plane of the surface of the outside of the casing, and said keys having a center position and a position on each side of said center position, each key generating a different digital logic signal at each side position that is controlled by the tip of each finger or the tip of the thumb.

2. The keyboard of claim 1, wherein the improvement further comprises;

each key having two movable pushbuttons, said pushbuttons normally being flush with said key, and said pushbuttons responsive to an input signal so that each of said pushbuttons are moved outward from said key perpendicular to the surface of said key in response to said input signal, to transmit a tactile message to the keyboard operator.

3. The keyboard of claim 1, for use with a peripheral data handling device, wherein the improvement further comprises;

means for attaching said data handling device to said keyboard, said keyboard communicating data signals to and from said data handling device.

4. The keyboard of claim 1, for use with a peripheral data handling device, wherein the improvement further comprises;

means for interconnecting said data handling device to said keyboard, said keyboard communicating data signals to and from said data handling device.

5. The keyboard of claim 1, for use with a peripheral data handling device, wherein the improvement further comprises;

means for attaching and interconnecting said data handling device to said keyboard, said keyboard communicating data signals to and from said data handling device.

* * * * *